(12) United States Patent
Adams et al.

(10) Patent No.: US 6,681,822 B2
(45) Date of Patent: Jan. 27, 2004

(54) NON-PNEUMATIC SPARE TIRE

(75) Inventors: Anthony Dennis Adams, Fairlawn, OH (US); Ronald James Dill, Copley, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 13 days.

(21) Appl. No.: 10/133,756

(22) Filed: Apr. 26, 2002

(65) Prior Publication Data

US 2003/0201043 A1 Oct. 30, 2003

(51) Int. Cl.[7] .................................................. B60C 7/10
(52) U.S. Cl. ............................... 152/7; 152/47; 152/326
(58) Field of Search ................................ 152/5, 7, 326, 152/17, 40, 41, 47, 11, 12, 323, 327, 328, 329

(56) References Cited

U.S. PATENT DOCUMENTS

| | | | |
|---|---|---|---|
| 1,166,314 A | * 12/1915 | Beckham | 152/326 |
| 1,175,151 A | * 3/1916 | johnstone | 152/51 |
| 1,277,789 A | * 9/1918 | van ness et al. | 152/326 |
| 1,344,346 A | 6/1920 | Krusemark et al. | |
| 1,430,100 A | * 9/1922 | Mitchell | 152/326 |
| 1,495,083 A | * 5/1924 | Krusemark | 152/303 |
| D68,536 S | * 10/1925 | Lenhoff | D12/569 |
| 1,617,870 A | * 2/1927 | Snider | 152/326 |
| 1,670,827 A | * 5/1928 | sieberling | 152/326 |
| 1,702,081 A | * 2/1929 | Hatfield | 152/44 |
| 1,762,905 A | 6/1930 | Whitlark | |
| 2,620,844 A | * 12/1952 | lord | 152/326 |
| 2,742,941 A | * 4/1956 | Johnson | 152/326 |
| 3,219,090 A | * 11/1965 | Cisclo | 152/7 |
| 3,311,149 A | * 3/1967 | Mathiesen | 152/7 |
| 4,226,273 A | 10/1980 | Long et al. | 152/326 |
| 4,549,592 A | * 10/1985 | Schroder | 152/328 |
| 4,945,962 A | 8/1990 | Pajtas | 152/7 |
| 5,042,544 A | 8/1991 | Dehasse | 152/302 |
| 5,139,066 A | 8/1992 | Jarman | 152/7 |
| 5,154,490 A | * 10/1992 | Burns | 301/44.3 |
| 5,265,659 A | * 11/1993 | Pajtas et al. | 152/329 |
| 5,343,916 A | 9/1994 | Duddey et al. | 152/5 |
| 5,435,367 A | * 7/1995 | Price | 152/310 |
| 5,460,213 A | * 10/1995 | Pajtas | 152/11 |
| 5,787,950 A | 8/1998 | Muhlhoff et al. | 152/379 |

* cited by examiner

*Primary Examiner*—Russell D. Stormer
(74) *Attorney, Agent, or Firm*—Nancy T. Krawczyk

(57) ABSTRACT

The present invention is a non-pneumatic tire comprising a rim and one or more elastomeric materials bonded to the rim or to one another. The tire has an equatorial plane, an annular tread, and an annular elastomeric body having first and second spaced lateral sides equidistant from the equatorial plane and extending between the tread and the rim. The tire body has a plurality of equally spaced arches forming at least a first series of openings extending from the first side to the second side. The first openings having a height at least one-half the height of the tire side.

8 Claims, 4 Drawing Sheets

NON-PNEUMATIC SPARE TIRE

FIELD OF THE INVENTION

This invention relates to an improved non-pneumatic tire that can be used primarily as a temporary spare tire. The improved tire is designed to replace the conventional pneumatic spare tire.

BACKGROUND OF THE INVENTION

Non-pneumatic tires are old in the art. Non-pneumatic solid rubber tires were in use prior to pneumatic tires. As vehicle speeds increased and ride characteristics became more important the need for a better tire structure emerged. The invention of the pneumatic tire provided a solution to the problems and limitations of solid tires.

The pneumatic tire is an efficient structure that has endured as a solution to conventional vehicle requirements. A pneumatic tire is a "tensile structure". Tensile structures always contain a compression member for providing a tensile preload in the tensile member. The tensile member can usually accept no compression and the compression member no tension. In pneumatic tires the cords are the tensile members and the compressed air is the compression member.

The primary drawback of a pneumatic tire is that it is pneumatic. Air contained under pressure can and usually does escape at the most inopportune times at least from the driver's viewpoint. It is aggravating to find that the spare tire that has been stored in the trunk for years is also flat.

The present invention has no air under pressure. It is a tire structure that performs similarly to a pneumatic tire without requiring pressurized air.

SUMMARY OF THE INVENTION

The present invention is a non-pneumatic tire comprising a rim and one or more elastomeric materials bonded to the rim or to one another. The tire has an equatorial plane, an annular tread, and an annular elastomeric body having first and second spaced lateral sides equidistant from the equatorial plane and extending between the tread and the rim. The tire body has a plurality of equally spaced arches forming at least a first series of openings extending from the first side to the second side. The first openings having a height at least one-half the height of the tire side.

In one aspect of the invention, each arch of the non-pneumatic tire has a constant radius of curvature.

In another aspect of the invention, the arches form a second series of openings circumferential and radially offset from the first openings. The second openings preferably have a triangular shape due to the arch configuration.

In another aspect of the invention, the first openings have a height of one-half to three-quarters of the tire side.

In another aspect of the invention, the openings in the non-pneumatic tire extend the fill width of the body. The openings may also vary in size across the width of the body.

Definitions

The invention also may be better understood in the context of the following definitions, which are applicable to both the specification and the appended claims:

"Axial" and "axially" are used herein to refer to lines or directions that are parallel to the axis of rotation of the tire;

"Elastomer" means a resilient material capable of recovering size and shape after deformation;

"Equatorial plane (EP)" means the plane perpendicular to the tire's axis of rotation and passing through the center of its tread;

"Footprint" means the contact patch or area of contact of the tire tread with a flat surface at zero speed and under normal load;

"Normal load" refers to the specific design load for the service condition for a tire;

"Pneumatic tire" means a laminated mechanical device of generally toroidal shape (usually an open-torus) having beads and a tread and made of rubber, chemicals, fabric, and steel or other materials;

"Radial" and "radially" are used to mean directions radially toward or away from the axis of rotation of the tire;

"Rim" means a support for a tire or a tire and tube assembly upon which the tire is secured; and "Tread" means a molded rubber component which, when bonded to a tire body, includes that portion of the tire that comes into contact with the road when the tire is under normal load.

BRIEF DESCRIPTION OF THE DRAWINGS

The invention will be described by way of example and with reference to the accompanying drawings in which.

DETAILED DESCRIPTION OF THE DRAWING

Figure 1:
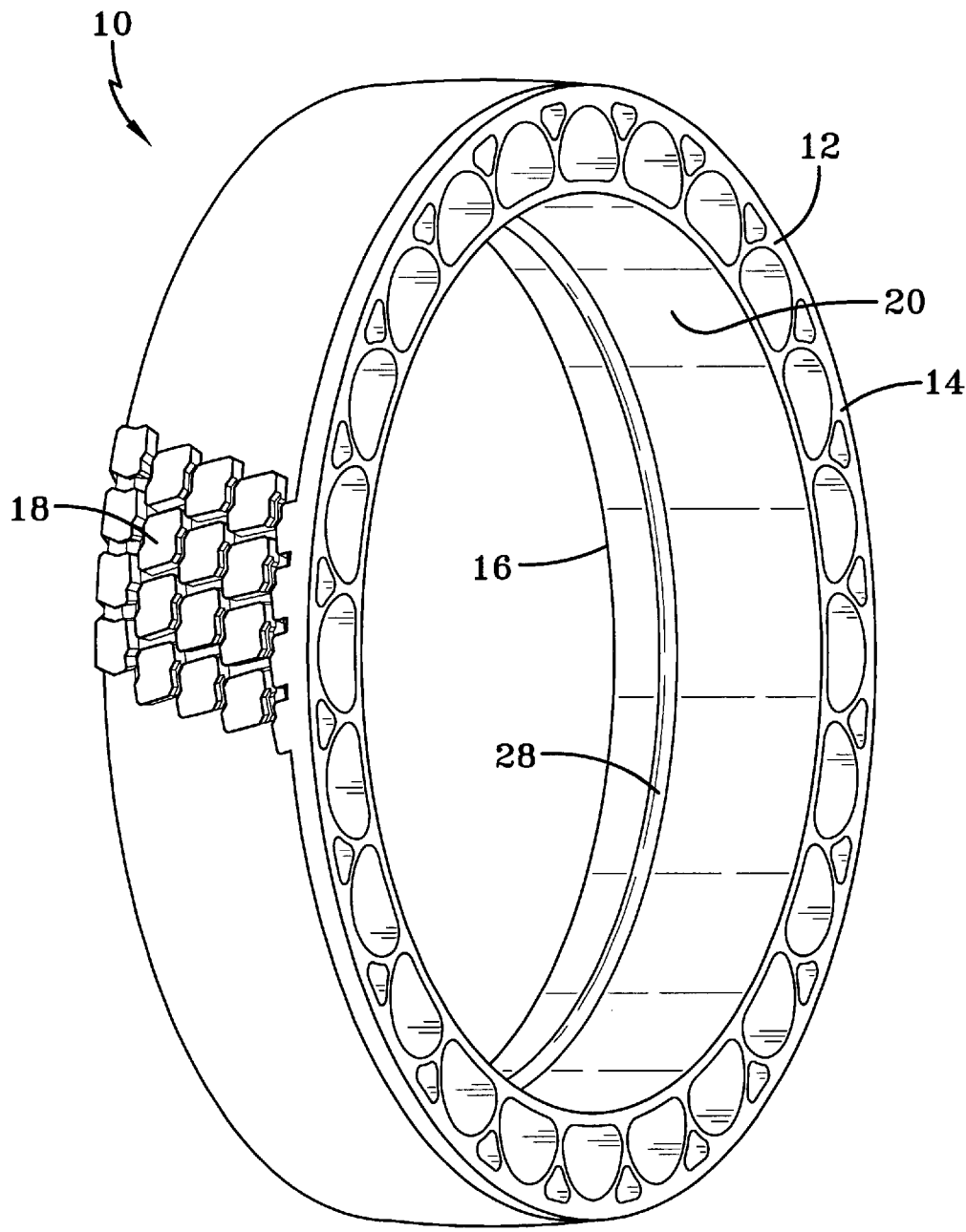
FIG. 1 illustrates an annular non-pneumatic tire of the invention without rim.
Figure 3:
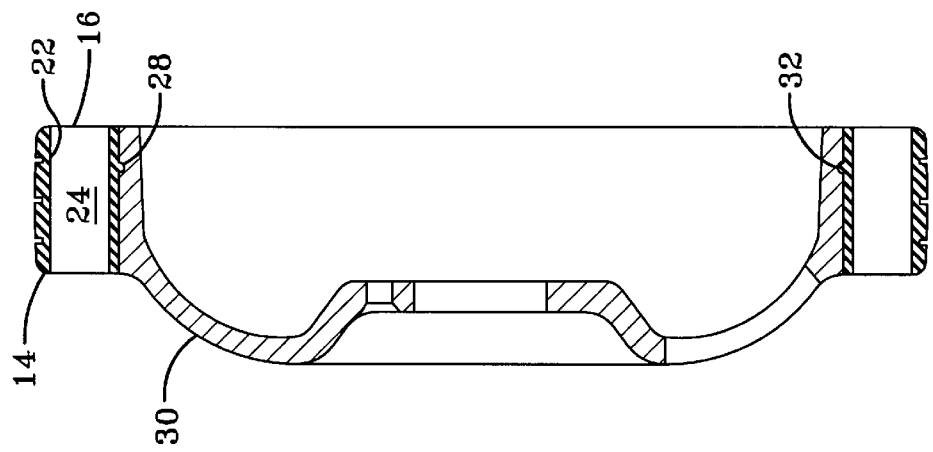
FIG. 3 is an enlarged cross-sectional view of the tire and rim taken along lines 3—3 of FIG. 2.
Figure 2:
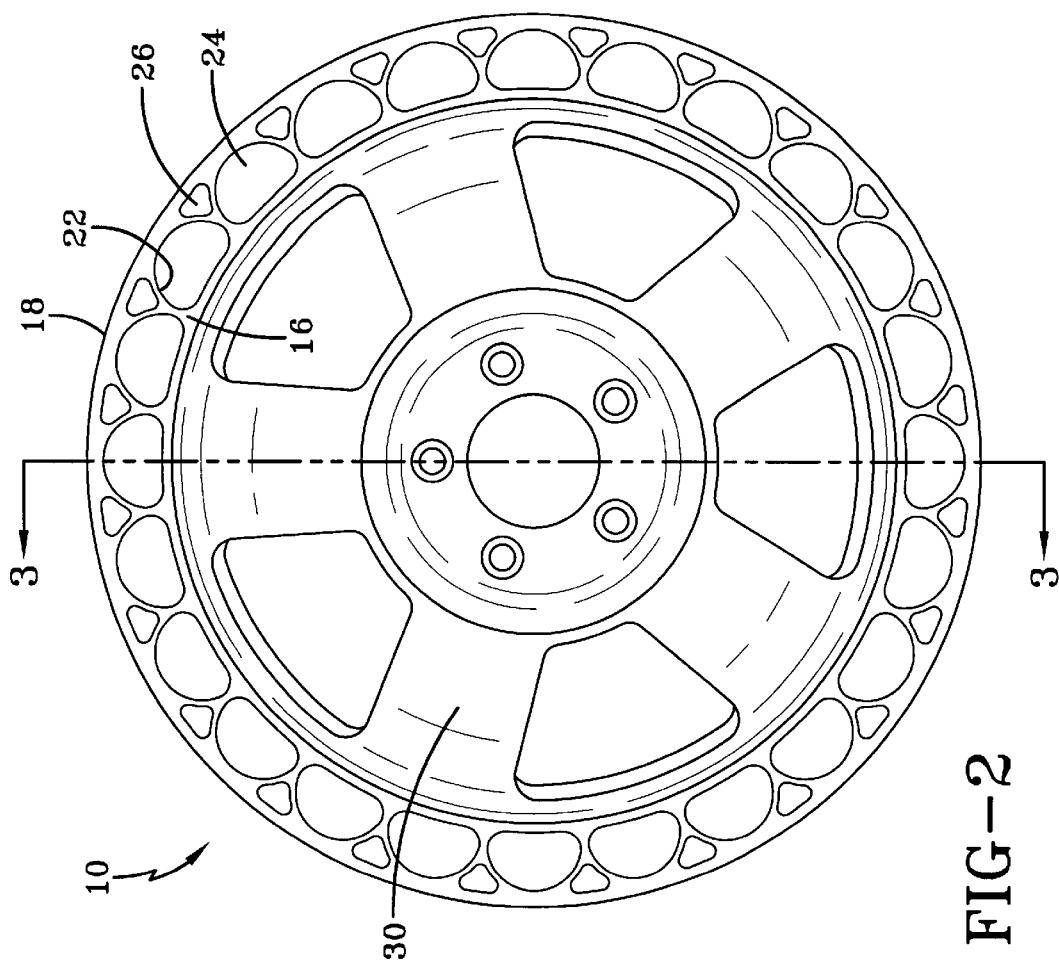
FIG. 2 illustrates a side view of the tire of FIG. 1 attached to or bonded to a rim.

With reference to FIGS. 1–3, a tire 10 has an annular body 12, which includes first and second sides 14, 16 respectively. Each side 14, 16 is equidistant from the equatorial plane and extends radially inwardly from the tread 18 and radially outward from the base 20. Between the tread 18 and the base 20 are a plurality of arches 22 forming a series of repeating primary openings 24 and a series of secondary openings 26 radially and circumferentially offset from the primary openings 24. In the illustrated tire 10, there are twenty-four primary openings 24 and twenty-four secondary openings 26.

A circumferential rib 28 is integrally molded into the body 12 and extends radially inwardly of the base 20 of the annular body 12. The rib 28 assists in fixing the annular body 12 to a rim 30.

In FIG. 2 a side view of the tire 10, including a rim 30, is illustrated. FIG. 2 further illustrates the arches 22 forming the primary openings 24 and the secondary openings 26. The arches 22 extend from one side 14 of the tire to the other side 16, so that the openings 24, 26 extend through the thickness of the width of the tire 10. The primary openings 24 have a height, relative to either side 14, 16 of the tire 10, of at least one-half the tire side 14, 16 height. As illustrated, the height of the primary openings 24 is approximately three-fourths of the side height. If the opening 24 is too small, the tire 10 fails to provide enough resiliency during use; conversely, if the opening 24 is too large, than there may be insufficient material to permit the tire 10 to operate as desired.

As shown in FIG. 3, the rim 30 is radially inward of the annular body 12. The mating surfaces of the rim 30 and annular body 12 are adhesively jointed. The rib 28 is interlocked with a circumferential groove 32 in the rim 30. This mechanical rib 28 assists in locking the annular body 12 to the rim 30.

Additionally, while not illustrated, the base 20 may be reinforced with inextensible reinforcing members. The reinforcing means can be individual wire filaments, individual cables, or wrapped steel cables. The selection of a reinforcing material will be dependant upon the material selection for the body 12 and upon the any desired strengthening of the body 12. The inextensible reinforcing members assist in preventing growth of the body 12 during rotation. Such an option is dependant upon the material selection for the body 12 and is preferably used only when the body 12 is formed of more resilient materials that may be subject to greater deformations while under operation.

Figure 4:
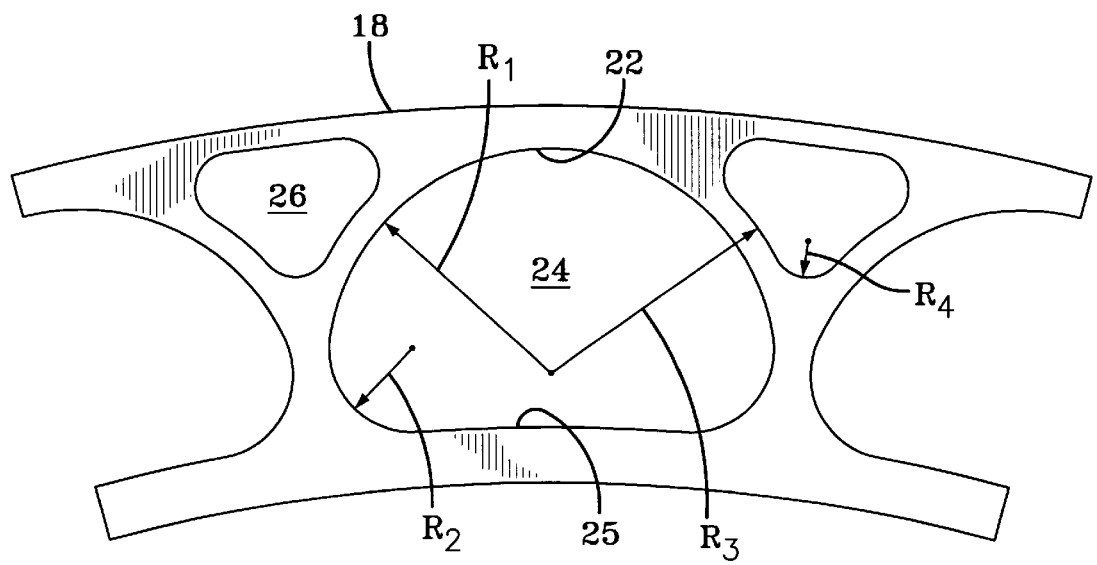
FIG. 4 is a side view of a portion of the tire and rim.

FIG. 4 illustrates just a portion of the tire body 12, showing the configuration of the arches 22 and formed primary and secondary openings 24, 26. For each arch 22, the maximum radial height of the arch 22 is closest to the tread 18.

The inner side of each arch 22 is defined by a first radius $R_1$ that defines the majority of the inner side of the arch. A second radius $R_2$ defines the portion of the arch radially inward where each arch 22 connects with the adjacent arch 22. Each second radius portion connects with a relatively flat base 25 of the primary opening 24. Each primary opening 24 may also be geometrically described as an arc joined by a chord wherein the connection points between the arc and the chord are rounded out.

The outer side of each arch, having a radius $R_3$, forms the two lower sides of the three sided secondary opening 26. The secondary opening 26 may be geometrically described as an inverted triangle with the junctures between the three legs being rounded out. To minimize the stress on the three junctures, the junctures are all preferably formed with the same radius of curvature $R_4$.

The radius of each arch 22 is identical to allow for equal load sharing. The dimensions of the radii, the resulting thickness of the individual arches 22, the number and size of the arches 22 is based upon a number of factors, including, but not limited to, the material selection for the body 12, the circumferential length of the body 12, the anticipated load characteristics, and desired operating conditions.

Because of these factors, some of which may be excluded when designing the body 12, and the flexibility of the arch design, for a single tire size, a variety of bodies with different arch dimensions can be designed. For example, when using a more resilient material, the arches may be relatively thicker resulting in fewer number of primary openings 24, while when using a less resilient material, the arches may be relatively thinner resulting in a larger number of primary openings 24.

Figure 5:
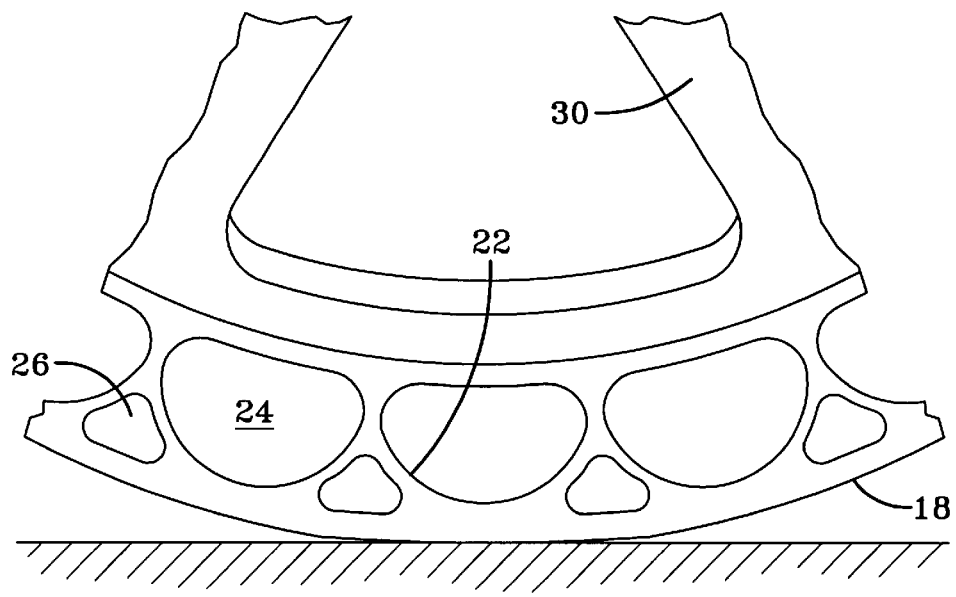
FIG. 5 is a side view of a portion of the tire and rim under a normal load illustrating the deflection of the tire.

FIG. 5 illustrates the tire 10 under a loaded condition. The area 32 in contact with the road surface defines a contact path or footprint. Radially inward of the contact path, the annular body 12 is compressed. When the body 12 is compressed, the arches 22 flex down, transferring the weight down the sides of the arches 22 to the base 20 and the rim 30. As seen, the arches 22 flexes downward, instead of collapsing or buckling as an internal column type support would.

Figure 6:
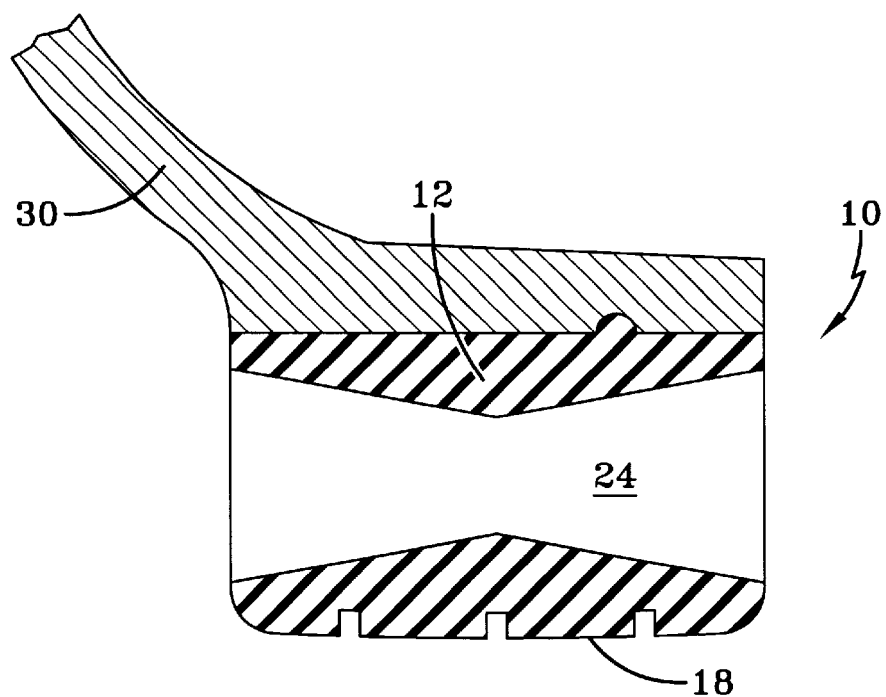
FIG. 6 illustrates an embodiment of the non-pneumatic tire.

An alternative embodiment of the annular body 12 is illustrated in FIG. 6. This is a cross sectional view similar to the lower portion of FIG. 3. However, in this embodiment, the width of the primary opening 24, from each side 14, 16 of the body 12 decreases as approaches the equatorial plane of the body 12. This embodiment provides more material at the equatorial plane of the body 12.

Figure 7:
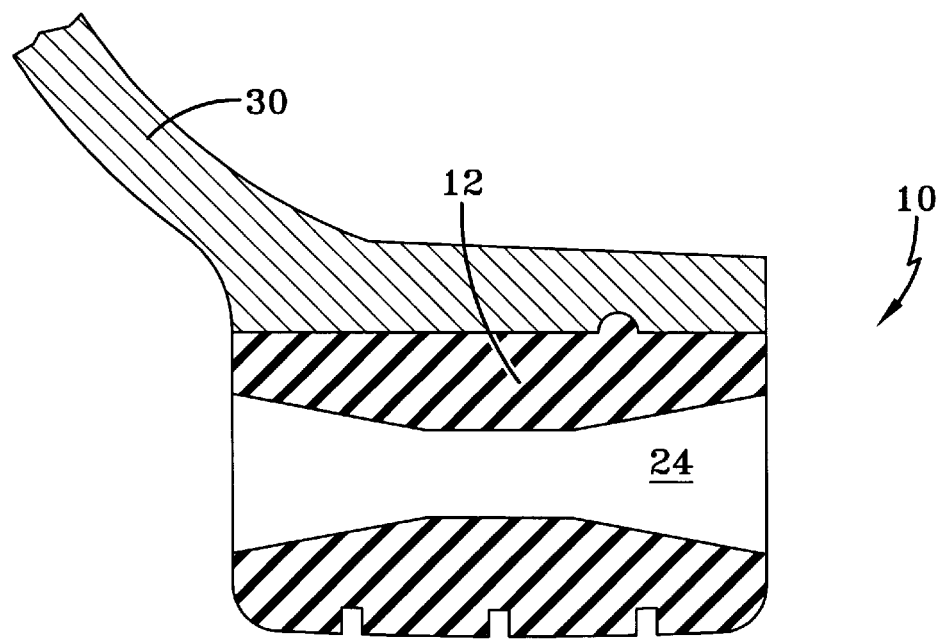
FIG. 7 illustrates another embodiment of the non-pneumatic tire.

Another embodiment is illustrated in FIG. 7. In this embodiment, the size of the primary opening 24 decreases as it approaches the equatorial plane from each side of the body 12, and maintains a constant diameter at the central portion of the body 12.

The secondary openings 26 may also have varying widths similar to the primary opening 24 embodiments of FIGS. 6 and 7. Alternatively, the secondary openings 26 may be entirely eliminated from the body 12.

Also, to vary the ride characteristics of the tire 10, either the primary or secondary openings 24, 26 may be completely or partially filled with a foam rubber.

While the arches 22, and the corresponding formed primary and secondary opening 24, 26 are illustrated as extending straight across the transverse width of the tire, the openings 24, 26 may be in a variety of configurations. The openings 24, 26 may extend obliquely across the tire width, may be curved across the tire width, or may be v-shaped across the width. By varying the orientation of the openings 24, 26, and thus the orientation of the arches 22, under load the openings 24, 26 will progressively collapse and at no time will the load be completely on one single arch 22, but will be further distributed over adjacent arches 22.

In the preferred embodiment, the tread portion 18 comprises a first resilient material and the body 12 comprises a second resilient material.

The annular body 12 is comprised of a material having a Young's modulus E from about 21 to about 21,000 $Kg/cm^2$. For use as a temporary spare tire for passenger vehicles, it is preferred to use an elastomeric material having a Young's modulus E from about up to 421 $Kg/cm^2$ with a more preferred range being from 105 to less than 351 $Kg/cm^2$. The preferred tensile modulus at 300% is 161 $Kg/cm^2$ or 915.9 MPa's.

A Young's modulus E greater than 140 $Kg/cm^2$ may require a mixture of polyurethane and chopped fibers of an aromatic polyamide. One form of elastomeric material which is believed to be preferred especially for tires is polyurethane. In the preferred embodiment the annular body is made from an isocyanate terminated polyester with a Shore hardness of 87A, a % NCO content of 6.8 and a 100 degree Celsius viscosity of 740 MPa.s.

While a Shore A hardness of between 60 and 100 is desired for the body 12 and 25 to 70 for the tread, it is preferred that the tread be in the range of 55 to 65 and the body in the range from 80 to 95 for passenger spare tires.

The tread material can be made from any conventional compound used in passenger tires, such as natural rubber, SBR, polybutadiene, or blends of these compounds.

The rim 30 could be made from steel, aluminum, or other metal alloys. Alternately it could be made from reinforced synthetic composite materials. One example of a suitable material is a non-oriented fiber reinforced resinous composite materials; specifically, glass reinforced vinyl ester.

The tire 10 may be manufactured by several acceptable manufacturing processes. Specifically, the annular body 12 may be molded in a mold utilizing liquid injection of the urethane from the bottom, or the urethane material can be poured into the mold from the top, thus filling the mold cavity, or thirdly the urethane may be added to a mold and spin cast to form the annular body 12.

The body 12 can be molded directly onto the rim utilizing any of the three above-mentioned processes. Alternatively, the body 12 can be adhesively fixed to the rim 30 as a secondary operation. In either case, the rim 30 must be cleaned and an adhesive coating applied to the rim 30 to ensure adequate bonding of the rim 30 to the body 12 of the tire 10.

The annular body 12 is buffed along the surface to which the tread layer is to be mounted. After buffing the surface, adhesive is applied. After preparing the body 12 with adhesive, a green rubber strip of material is layered onto the prepared surface of the body 12, the unvulcanized material to be formed into the tread 18 of the tire 10 after molding.

The assembly is placed in a conventional mold. The tire 10 is cured at a temperature of about 149° C. for one hour. The mold provides compression to the assembly and forms the tread 18 that is vulcanized directly on the annular body 12. The tire 10 and rim 30 assembly is then removed from the mold. The urethane body 12 requires aging after manufacture. In the preferred embodiment the annular body is aged at 121° C. after curing and bonding the tread to the tire assembly.

An alternative method of manufacture of the urethane body 12 simplifies the manufacturing process. In an alternative method of manufacture, a rim 30 and a prepared precured tread 18 are placed into the mold for forming the annular body 12. The body material is injected into the cavity, thus bonding directly to the tread 18 and the rim 30. The complete tire assembly is removed from the mold. The tire assembly is then aged at 121. degree. C. for 12 hours. After aging the tire 10 is ready for use.

As discussed, by providing the body 12 with arches 22, the arches 22 flex and compress with load, transferring forces to the wheel rim 30. The flexing of the arches 22 reduces harshness of the tire 10 as the tire 10 rotates through the footprint. Also, the design of the arch 22 provides for great flexibility in the exact design of the tire body 12.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the fill intended scope of the invention as defined by the following appended claims.

What is claimed is:

1. A non-pneumatic tire comprising a rim and one or more elastomeric materials bonded to the rim or to one another,
   the tire having an equatorial plane, an annular tread, and an annular elastomeric body having first and second spaced lateral sides equidistant from the equatorial plane and extending between the tread and the rim,
   the body being characterized by a plurality of equally spaced arches forming at least a first series of openings extending from the first side to the second side, the first openings having a height at least one-half the height of the tire side and the first openings having a relatively flat base.

2. A non-pneumatic tire according to claim 1 wherein each arch has a constant radius of curvature.

3. A non-pneumatic tire according to claim 1 wherein the arches form a second series of openings circumferential and radially offset from the first openings.

4. A non-pneumatic tire according to claim 3 wherein the second openings have a triangular shape.

5. A non-pneumatic tire according to claim 1 wherein the first openings have a height of one-half to three-quarters of the tire side.

6. A non-pneumatic tire according to claim 1 wherein the first openings extend the full width of the body.

7. A non-pneumatic tire according to claim 1 wherein the size of the first openings varies across the width of the body.

8. A non-pneumatic tire according to claim 1 wherein the openings have a configuration corresponding to an arc joined by a chord wherein the connection points between the arc and the chord are rounded out.

\* \* \* \* \*